Burt & Smith,
Making Staves.
№ 1,208.  Patented June 29, 1839.
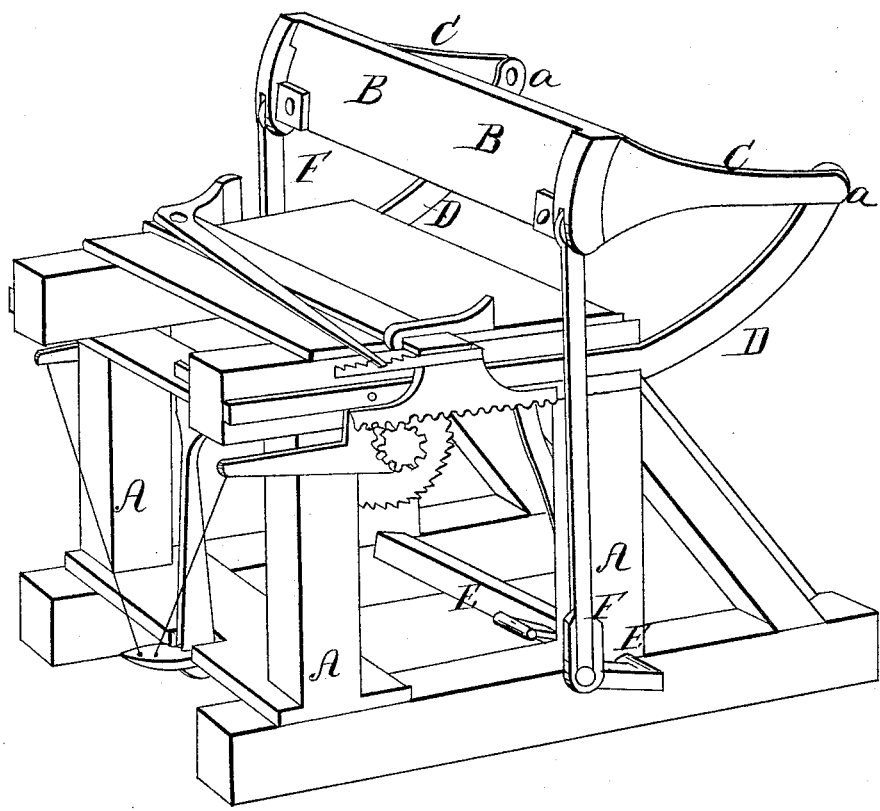

UNITED STATES PATENT OFFICE.

JONATHAN BURT, OF SULLIVAN, AND ERASMUS SMITH, OF NORWICH, NEW YORK.

MACHINE FOR CUTTING STAVES.

Specification of Letters Patent No. 1,208, dated June 29, 1839.

*To all whom it may concern:*

Be it known that we, JONATHAN BURT, of Sullivan, in the county of Madison, and ERASMUS SMITH, of Norwich, in the county of Chenango, State of New York, have invented an Improvement in Machines for Cutting Staves for Barrels, Kegs, and other Stuff for Coopers' Work; and we do hereby declare that the following is a full and exact description thereof.

The machine in which our improvement is made is that for which Letters Patent of the United States were granted to George Pack and dated on the 10th day of October, in the year 1835.

Our improvement consists in the manner in which we effect this vibration of the knives, and is clearly exhibited in the accompanying drawing, which is a perspective view thereof.

A, A, is the frame which may be made of wood, or of iron.

B, B, is the knife, which is like that described by the said George Pack. From the iron frame to which the knife is attached two arms C, C, extend back, and these work on joint pins at *a*, *a*, passing through them, and through permanent arms D, attached to the frame of the machine; the length of the arms C, C, determines the curvature to be given to the staves.

C, is a crank shaft, extending from side to side of the machine, and having a similar crank at each end, from each of which a pitman, or shackle bar F, F, extends and is attached by a joint to the knife frame. The power to work the machine is to be applied to the crank shaft E. The difference between this arrangement, and that adopted by George Pack will be at once manifest, as will also the reality of the improvement. In Pack's machine the knife frame is attached to the short arm of a lever, the long arm of which extends out behind it, and is operated on by lifters or wipers, on a revolving shaft, which forces the knife down, by which arrangement much power is lost from the unavoidable spring of the lever, and of the other parts of the apparatus, while, by our improved mode of conveying the power to the knife directly from the crank shaft to the knife frame, this loss is avoided, and the machine is rendered much more compact, works more quietly and steadily, and is consequently more durable.

The feeding apparatus which we employ, the jaws for holding the stuff to be cut, and for throwing the machine into and out of gear, we usually construct in a manner similar to that described by us in the specification of our machine for cutting shingles, for the use of which we apply for Letters Patent of the United States, simultaneously with this present application, the requisite oath to each bearing the same date; but to this particular mode of feeding we do not here make any claim, nor do we intend in practice to confine ourselves thereto.

What we claim as our improvement in the above described machine, and desire to secure by Letters Patent, is—

The mode herein described of communicating motion to the cutting knife, directly from the crank shaft placed below it, while the knife itself is made to move in the proper curve to be given to the stave, by means of the arms upon which it is hung, as set forth.

JONATHAN BURT.
ERASMUS SMITH.

Witnesses:
JAMES M. D. CARR,
BENJ. E. RANDALL.